(12) United States Patent
Rooymans

(10) Patent No.: US 7,982,378 B2
(45) Date of Patent: Jul. 19, 2011

(54) LIGHTING DEVICE AND LIGHTING SYSTEM FOR STIMULATING PLANT GROWTH

(75) Inventor: Johannes Otto Rooymans, Ermelo (NL)

(73) Assignee: Lemnis Lighting Patent Holding B.V., Naarden (NL)

( * ) Notice: Subject to any disclaimer, the term of this patent is extended or adjusted under 35 U.S.C. 154(b) by 361 days.

(21) Appl. No.: 12/279,726

(22) PCT Filed: Feb. 13, 2007

(86) PCT No.: PCT/EP2007/051406
§ 371 (c)(1),
(2), (4) Date: Aug. 18, 2008

(87) PCT Pub. No.: WO2007/093607
PCT Pub. Date: Aug. 23, 2007

(65) Prior Publication Data
US 2009/0039752 A1       Feb. 12, 2009

(30) Foreign Application Priority Data

Feb. 17, 2006   (NL) .................................... 1031185

(51) Int. Cl.
*H01J 7/24*         (2006.01)
(52) U.S. Cl. ................ 313/44; 313/512; 47/17

(58) Field of Classification Search .................... 313/36, 313/44, 512; 47/17
See application file for complete search history.

(56) References Cited

U.S. PATENT DOCUMENTS

| 4,196,544 | A | * | 4/1980 | Davis et al. | ........................ 47/17 |
| 6,127,779 | A | * | 10/2000 | True | .................................. 315/5 |
| 7,049,743 | B2 | * | 5/2006 | Uchiyama | ..................... 313/512 |
| 2001/0018828 | A1 | * | 9/2001 | Kadotani | .......................... 62/3.2 |
| 2002/0113534 | A1 | * | 8/2002 | Hayashi et al. | ............... 313/113 |
| 2003/0076021 | A1 | * | 4/2003 | Woolford | ......................... 313/44 |
| 2006/0034085 | A1 | | 2/2006 | Wang et al. | |
| 2007/0113474 | A1 | * | 5/2007 | Everett et al. | ................... 47/65.8 |

FOREIGN PATENT DOCUMENTS

| DE | 19515182 A1 | 11/1996 |
| JP | 2000-135030 A | 10/2000 |
| WO | 03103064 A1 | 12/2003 |
| WO | 2005089477 A2 | 9/2005 |

\* cited by examiner

*Primary Examiner* — Nimeshkumar D Patel
*Assistant Examiner* — Mary Ellen Bowman
(74) *Attorney, Agent, or Firm* — Hoyng Monegier LLP; David Owen; Coraline J Haitjema

(57) ABSTRACT

The invention relates to a lighting device for stimulating plant growth. The lighting device has a solid state light source, suitable for emitting light of at least one wavelength within a predetermined wavelength range. Furthermore, the solid state light source is adapted for connection to an electrical network. The solid state light source is in contact with a cooling medium. In an embodiment, this cooling medium has a temperature in a temperature range between −50 and 0° C.

18 Claims, 6 Drawing Sheets

LIGHTING DEVICE AND LIGHTING SYSTEM FOR STIMULATING PLANT GROWTH

BACKGROUND OF THE INVENTION

1. Field of the Invention

The invention relates to a lighting device for stimulating plant growth, comprising at least one solid state light source, suitable for emitting light of at least one wavelength within a predetermined wavelength range, wherein the at least one solid state light source is adapted for connection to an electrical network.

2. Description of the Related Art

The photosynthesis process for plant growth at deep-red light is based on the absorption of light with a peak wavelength of 662 nm by chlorophyll A and light with a peak wavelength of 642 nm by chlorophyll B. In general, red Light Emitting Diodes (LEDs) have the highest efficiency among the LEDs, i.e. a relatively high emitted power per Watt, wherein the non-emitted power is converted into heat.

However, the light yield of red LEDs drastically decreases with an increase in junction temperature, i.e. the temperature at the junction of P-N semiconductor materials of the LED. For this reason, LEDs are mostly mounted on a cooling element.

It has been shown that with a temperature increase of the LED semiconductor junction from 20° C. to 75° C., the light yield may decrease with at least a factor of two.

Red LEDs of a.o. the AlGaInP (Aluminum Gallium Indium Phosphide) type are considerably more sensitive to temperature changes than for example green and blue LEDs, for example of the InGaN (Indium Gallium Nitride) type. An advantage of AlGaInP LED material is that the life span is extremely long, i.e. under normal conditions such material has a life span of 100,000 hours.

The Japanese patent applications JP 2003009662 and JP 2004113160 and the U.S. Pat. No. 6,921,182 describe the application of LEDs for plant growth. Herein, among other, use is made of red LEDs. In all of these patent publications low-power LEDs are used, in this case with a power of approximately 60 mW. The temperature of the carrier of these LEDs may rise rapidly, as a result of which the efficiency and the scope of application remains largely below the current assimilation lighting with gas discharge lamps adapted for plant growth. For example, for taking over the task of a standard sodium lamp of 600 W 10,000 of such LEDs would have to be used.

Hence, large-scale application of LEDs in greenhouses demands large numbers of power LEDs of 0.5 W or more. Such LEDs produce a lot of heat. Therefore, the carriers for such LEDs are provided with a part which is adapted for emitting the heat generated by the power LEDs. A well-known technique for semiconductor cooling is mounting the LEDs on a plate such that they make a good thermal connection with the plate. On its turn, the plate is connected to a device wherein the absorbed heat can be emitted. In such a heat release system the heat generated is conducted by the plate using heat conduction to the location for heat emission and is subsequently dissipated into the surroundings using radiation. Although such a heat emission system reduces the temperature of a carrier, this is generally still insufficient.

BRIEF SUMMARY OF THE INVENTION

The invention aims at providing a more efficient heat emission for a lighting device for stimulating plant growth as compared to devices of the state of the art.

Hence, the lighting device according to the present invention comprises the feature that the at least one solid state light source is in contact with a cooling medium. In an embodiment, the cooling medium has a temperature in a temperature range between −50 and 0° C., preferably between −50 and −20° C. Hence, the lighting device comprises a cooled solid state light source. By cooling the light source, the efficiency of the lighting device is increased. In one embodiment, the lighting device is further provided with a first tube, of which at least part of it is transparent for light from a predetermined wavelength range, wherein the at least one solid state light source is positioned in the first tube. Such a positioning of the at least one solid state light source offers additional protection.

In one embodiment thereof the first tube is suitable for receiving the cooling medium and is provided with a supply opening and a discharge opening for respectively supplying and discharging the cooling medium and the lighting device is further provided with a second tube with a larger diameter than the first tube and positioned such that it encloses the first tube, wherein the second tube is at least partly transparent for light from a predetermined wavelength range. In this embodiment, the at least one light source is cooled directly by the cooling medium. The space between the first and second tube can be filled with a suitable inert gas, for example nitrogen, to prevent condensation or the formation of ice.

In another embodiment thereof, the lighting device is further provided with a third tube with a smaller diameter than the first tube and is positioned such that it is enclosed by the first tube, wherein the third tube is a metal tube suitable for receiving the cooling medium and is provided with a supply opening and a discharge opening for respectively supplying and discharging the cooling medium and wherein the at least one solid state light source is positioned in contact with the third tube between the first and the third tube. In contrast to the previous embodiment, there is no direct contact between the at least one solid state light source and the cooling medium, such that dissolving in the cooling medium of part of the connections of the at least one solid state light source is prevented, particularly if they are soldered. Such a dissolving may cause a rupture of the connection or may cloud the cooling medium. The third tube may comprise a metal such as copper and/or aluminium. Such metals are good electrical conductors and can ensure that the third tube may serve as an electrical connection. Hence, the third tube may form a first connection of the at least one light source with the electrical network. In such a case, the lighting device may be further provided with a metal strip, which is electrically isolated from the third tube and which forms a second connection of the at least one light source with the electrical network.

In both aforementioned embodiments, the lighting device can further comprise a spacing means for maintaining the first tube at a certain predetermined distance with respect to the second tube or the third tube. In this way the tubes may be aligned in a controlled way with respect to each other.

The at least one solid state light source can be a LED. Such a light source may be positioned in the vicinity of plants without these reaching a too high temperature by dissipation. The LED may comprise an opening angle between 30° and 90°. This angle offers the possibility of directing the emitted light. The LEDs may be mounted on a ceramic substrate.

Light sources that are highly preferred in this invention are light sources that are suitable to emit light between 640-700 nm, for example red LEDs. Particularly, an optimum temperature for the functioning of such LEDs is ranges between −40 and −20° C. Suitable cooling media comprise carbon dioxide and alcohol.

The invention further relates to a lighting system for stimulating plant growth in a greenhouse, comprising:
  a plurality of lighting devices according to one of the aforementioned embodiments with more than one tube;
  a cooling system adapted for cooling a cooling medium provided with an input and an output;
wherein tubes in the plurality of lighting devices, which are adapted for receiving and transporting the cooling medium form a circulation channel in contact with the input and output of the cooling system, and wherein the at least one solid state light source per lighting device of the plurality of lighting devices is electrically connected in parallel with respect to each other.

The invention further relates to a method for manufacturing a lighting device as described above, wherein the method comprises:
  providing a first tube;
  providing at least one of a second tube and a third tube;
  positioning the first tube with respect to at least one of the second tube and the third tube such that one of both tubes is enclosed by the other one;
  introducing a spacing means between both tubes to fix their mutual position;
  positioning the at least one solid state light source in the first tube such that it is in contact with a cooling medium, which is situated in one of both tubes, when the lighting device is in use.

In one embodiment thereof, providing the tubes, positioning the first tube with respect to at least one of the second tube and the third tube, as well as introducing the spacing means is conducted simultaneously using extrusion.

Finally, the invention further relates to a method for using a lighting device as described above, wherein the method comprises cooling the at least one light source to a temperature in a temperature range between −50° C. and −20° C.

BRIEF DESCRIPTION OF THE DRAWINGS

Hereafter, the invention will further be elucidated by way of an example using the following figures. The figures are not intended to limit the scope of the invention, but only to illustrate the invention.

DESCRIPTION OF ILLUSTRATIVE EMBODIMENTS

Figure 1:
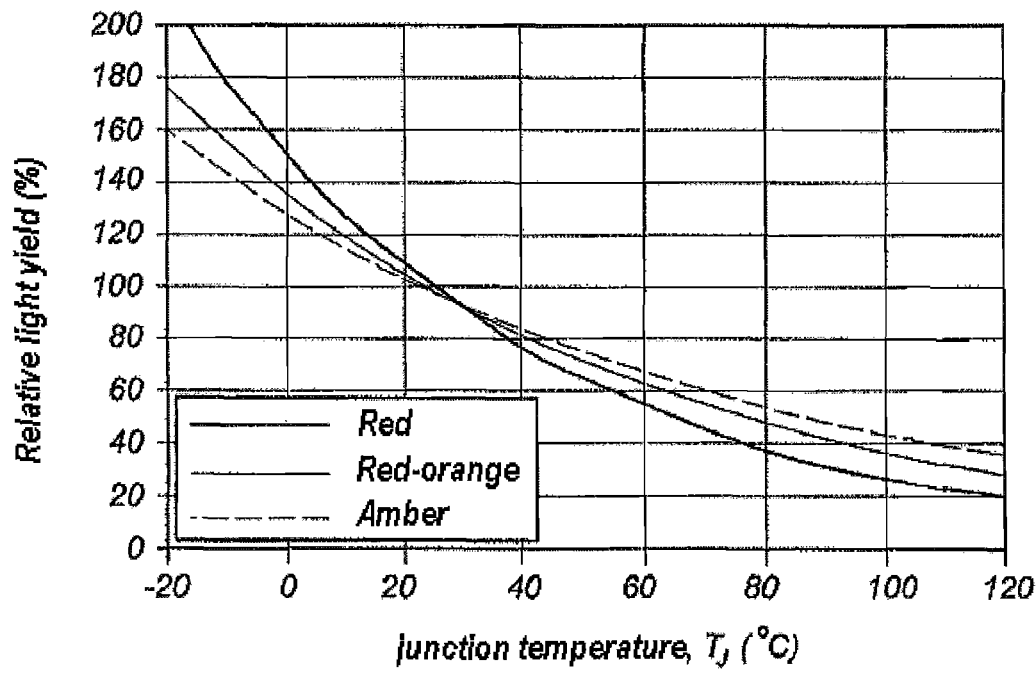
FIG. 1 shows a graph in which the relative light yield of a LED is plotted as function of a temperature on a semiconductor junction in a LED.

FIG. 1 shows a graph in which the relative light yield of a LED is plotted as function of a temperature on a semiconductor junction in a LED. From this graph, it appears that for the LED-types shown, namely red (dotted line), red-orange (solid grey line) and amber (solid black line), the light yield rapidly decreases with the temperature of the semiconductor junction, hereafter called junction. However, from the graph in FIG. 1 may also be concluded that the light yield rapidly increases when the temperature is lowered, particularly at temperatures lower than 20° C.

Figure 2:
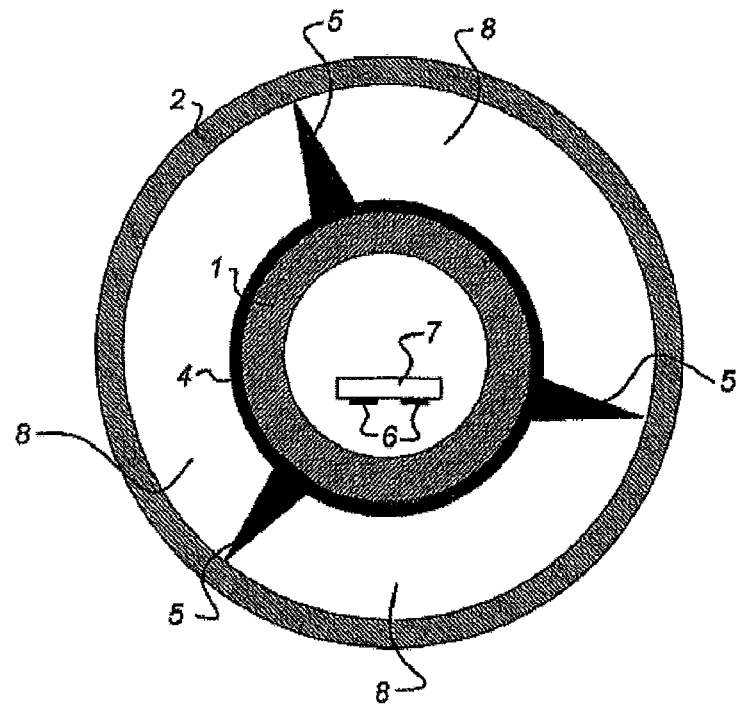
FIG. 2 shows a cross section of a first embodiment of a lighting device according to the present invention.

FIG. 2 shows a cross section of a first embodiment of a lighting device according to the present invention. The lighting device comprises a cooling device for cooling at least one solid state light source, for example one or more LEDs 6. The cooling device comprises an inner tube 1 and an outer tube 2, wherein both tubes 1, 2 are transparent for the light emitted by the one or more LEDs. The inner tube 1 and outer tube 2 are mutually connected, for example using contact points 5 of a spacing means, for example a spacing disc 4, wherein the contact points 5 preferably contact the inner tube 1 on regular distances. The inner tube 1 is partly or entirely filled with a cooling medium, for example a coolant with a suitable solidification temperature, such as glycol, alcohol or liquid carbon dioxide ($CO_2$) or a gas, for example ($CO_2$) gas or air. In the inner tube 1, one or more LEDs 6 are positioned, hereafter simply indicated as LEDs 6, which may be positioned freely connected in the inner tube 1. The LEDs 6 are part of an electrical circuit which effects a suitable illumination of the surroundings, particularly for stimulating plant growth.

Preferably, the LEDs 6 have an opening angle from 30° to 90°. Because of its restricted opening angle, the light produced by the LEDs can exclusively be directed onto the crops, and hence the quantity of light that does not come in contact with the crops is restricted to a minimum. When determining an optimum opening angle the fact may be taken into account that the intensity of the emitted power increases with the square of the decrease of the opening angle.

In view of the low temperature of the cooling medium in which the LEDs 6 are positioned, as shown in FIG. 2, a carrier 7 for the LEDs 6, which can be used as extra cooling element, is not strictly necessary. Cavities 8 between the inner tube 1 and outer tube 2 can be filled with a suitable inert gas, for example nitrogen, to prevent condensation or the formation of ice on the inner tube 1. The contact points 5 between the inner tube 1 and the outer tube 2 must be as small as possible in order to minimize heat loss by heat transfer.

In FIG. 2, a spacing disc 4 is shown as a spacing means, wherein the spacing disc contacts the inner tube 1 and comprises contact points 5, which make contact with the outer tube 2. However, it is possible to design a spacing disc wherein the spacing disc contacts the outer tube 2 and which comprises contact points 5, which make contact with the inner tube 1, as is known to the person skilled in the art.

In this embodiment, electrical connections between LEDs, as well as a connection with an external electrical network, are formed by a concatenation using conductive wires, for example of copper.

Figure 3:
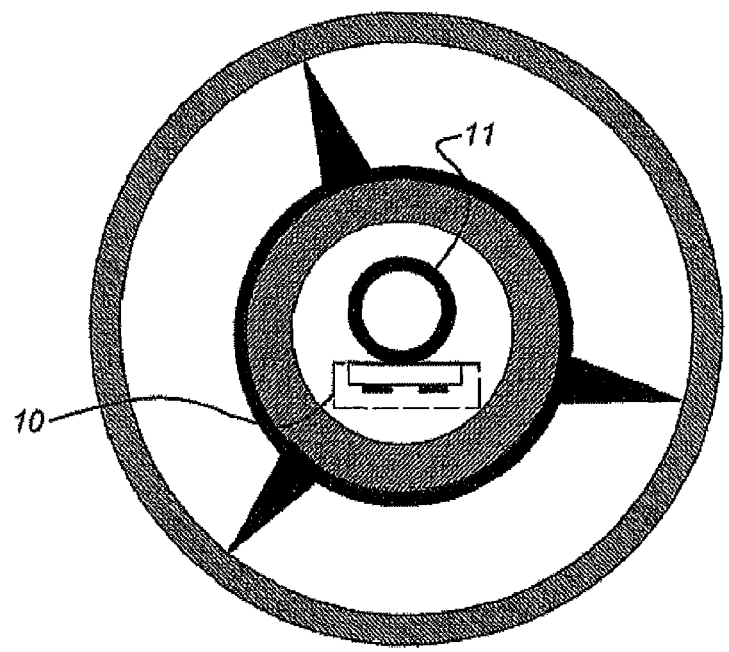
FIG. 3 shows a cross section of a second embodiment of a lighting device according to the present invention.

FIG. 3 shows a cross section of a second embodiment of a lighting device according to the present invention, provided with a cooling device for cooling at least one solid state light source, for example one or more LEDs 6. This cooling device also comprises an inner tube 1 and an outer tube 2, wherein both tube 1, 2 are transparent for light that is emitted by the LEDs 6. Again, the inner tube 1 and the outer tube 2 may be mutually connected, for example using contact points 5 of a spacing means, for example a spacing disc 4, wherein the contact points 5 preferably contact the inner tube 1 on regular distances.

In contrast to the lighting device as shown in FIG. 2, the LEDs 6 forming part of an electrical circuit, hereafter called LED circuit 10, are mounted on a metal cooling tube 11. The metal of the metal cooling tube 11 may comprise materials such as a copper (Cu) and/or aluminium (Al). The LED-circuit 8 can be mounted directly on the metal cooling tube 11 using solder connections. However, it is also possible to mount the LED-circuit 10 on ceramic strips, i.e. ceramic substrates, with printed circuitry, which are in contact with the metal cooling tube 11. A cooling medium, for example a coolant or a cooled gas, flows through the cooling tube, such as, for example cooled $CO_2$-gas.

Besides providing cooling, the metal cooling tube 11 may further act as an electrical cable for a first connection of the LED-circuit 10 to an electrical network (not shown). Because in many applications, such as illuminating a large number of plants in a greenhouse, a relatively large electrical power will be necessary, the metal cooling tube 11 needs to be sufficiently thick. Because of the size of the greenhouses, electrical currents of 100 Amperes or more are no exception. For copper cables, as a rule of thumb, it applies that a flow of 10 Amperes per cross section $mm^2$ can be processed. At a low temperature, such as $-30°$ C., the specific resistance is lower, for example at $-30°$ C. approximately 25% lower than at room temperature. Hence, at this temperature at least 12.5 Amperes per $mm^2$ should be considered. If the tube is also actively cooled, which is the case here, it is possible to work with still higher current densities, for example 25 A/$mm^2$.

Because in this embodiment of the lighting device, only the LED circuit 8 on the cooling tube 11 is cooled, for example to a temperature of $-30°$ C., the remaining space in the inner tube 1 of the cooling device can be filled with a suitable gas, for example nitrogen, or with a isolation foam, for example polyurethane, with exception of the line of sight, i.e. the part through which light, originating from the LEDs, exits. The lighting device as shown in FIG. 3 has the advantage that there is no direct contact between the LEDs and the cooling medium, particularly if it concerns a coolant. In that case there is a high probability that part of the LED connections, particularly if they are soldered, dissolves in the cooling medium, as a result of which a rupture of the connection or a clouding of the cooling medium occurs. Furthermore, the lighting device as shown in FIG. 3, offers a better thermal insulation than the lighting device as shown in FIG. 2.

Separate components or a combination of components, for example a combination of inner tube 1, outer tube 2 and one or more distance discs 4, in the lighting devices as shown in FIGS. 2 and 3, can be formed using extrusion. Of course, the inner tube 1 and the outer tube 2 may also be formed separately and subsequently slid into each other. Whether an embodiment with one or two tube parts is preferred, depends on the shrinkage/expansion variations to be absorbed along the length of the respective cooling element.

Figure 4:
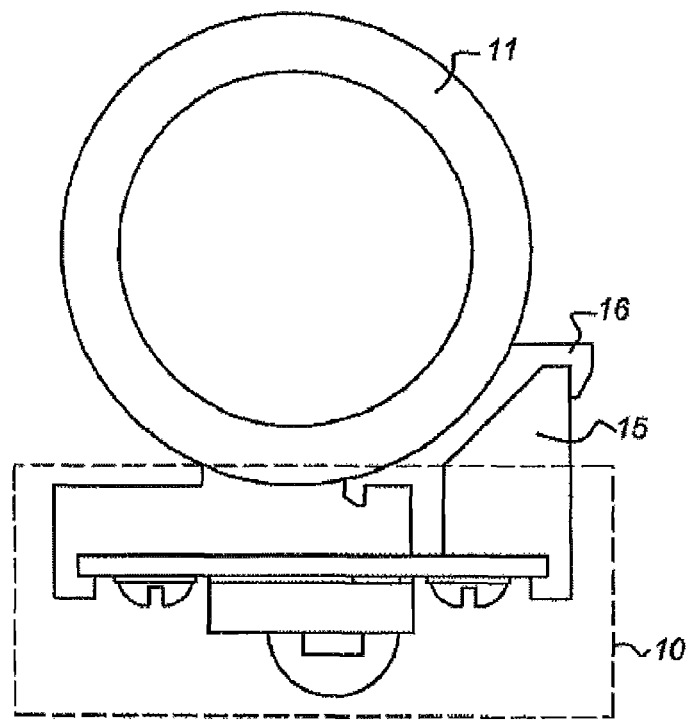
FIG. 4 shows a detail of the embodiment of the lighting device as shown in FIG. 3.

FIG. 4 shows in detail a possible connection of the metal cooling tube 11 with the LED-circuit 10 in the embodiment as shown in FIG. 3. By the connection shown in FIG. 4, the LED-circuit 10 is further connected via a second electrical connection with an electrical network (not shown). For example, the second electrical connection has the form of a metal strip 15, for example of copper and/or aluminium. To ensure that a galvanic separation exists between the first electrical connection, i.e. the metal cooling tube 11 and the second electrical connection, an electrically isolating clip 16 is introduced, for example made of a suitable plastic, between both connections 11, 15. An electrically isolating clip 16 of plastic can also be manufactured using extrusion techniques.

In many applications, it is convenient if one or more of the different tubes 1, 2, 11 is constructed from tube elements. With a lighting device as shown in FIG. 3, a metal cooling tube 11 may be formed by coupling the cooling tube elements. Furthermore, by this coupling an electrically conductive connection is obtained. The metal cooling tube 11 is connected with an electrical network (not shown), which may be operated for example on 22 V direct or alternating current. The metal cooling tube 11 forms a first electrical connection with one or more LED-circuits 8. The second electrical connection may be applied in an identical manner as described above. Again, the thickness of the metal cooling tube 11 is dependent on the power of the current and the material used. By using an electrical parallel coupling of several coupling elements, when using a large power, a sufficiently thick metal cooling tube 11 will be necessary. As described above, for copper piping, as a rule of thumb, it applies that a flow of 10 Amperes per cross section $mm^2$ can be processed. At low temperatures, such as $-30°$ C., the specific resistance is lower, for example at $-30°$ C. approximately 25% lower. Hence, at this temperature at least 12.5 Amperes per $mm^2$ should be considered. If the tube is also actively cooled, which is the case here, it is possible to work with still higher current densities, for example 25 A/$mm^2$.

Figure 5:
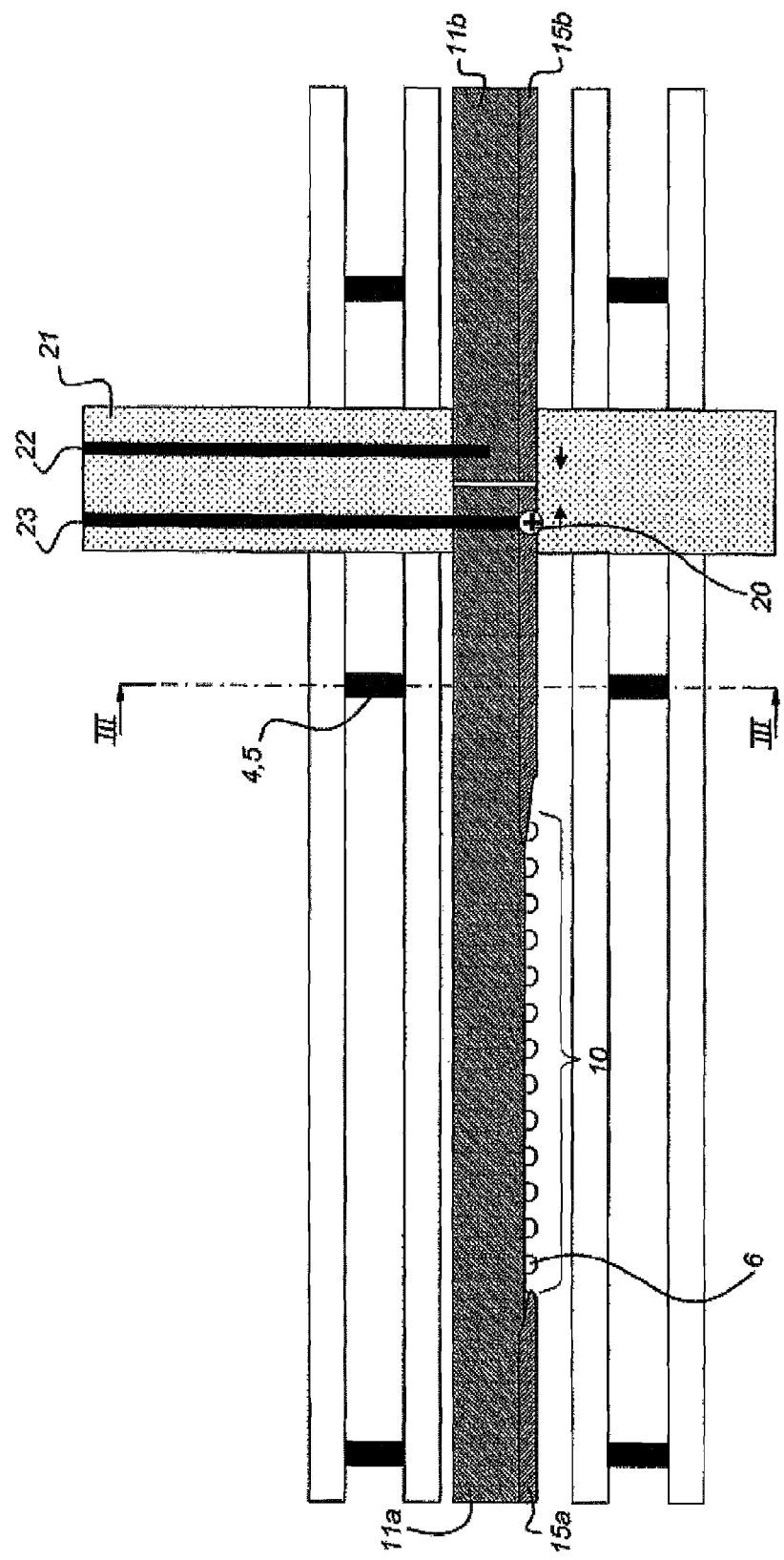
FIG. 5 shows a side view of a type of coupling of cooling tubes elements in an embodiment of the lighting device as shown in FIG. 3.

FIG. 5 shows a side view of a lighting device as shown in FIG. 3, wherein the metal cooling tube 11 comprises different cooling tube elements 11a, 11b. Furthermore, in the embodiment shown, the inner tube 1 and the outer tube 2 are divided into segments. A cross section as shown in FIG. 3 can be made by a section through the lighting device according to the line III-III.

In FIG. 5 is also shown that the different cooling tube elements 11a, 11b are mutually coupled by means of a coupling. The coupling of the cooling tube elements 11a, 11b and hence the connection of the LED-circuits 10a, 10b, each of which are connected with respectively the cooling tube elements 11a, 11b, can be realized, for example by use of adapted forms at the ends of the cooling tube elements 11a, 11b.

In the case as shown in FIG. 5, the metal cooling tube elements 11a, 11b are as shown in FIG. 4. Subsequently, a part has been removed from these cooling tube elements 11a, 11b from the end corresponding to the in FIG. 4 encircled area B, for example up to approximately 2 cm. Subsequently, the remaining virtually rounded ends can be coupled to each other, for example using an electrically conductive coupling tube. In that case, the ends of the cooling tube elements 11a, 11b may be moved towards each other, indicated by the arrows in FIG. 5, until the cooling tube elements 11a, 11b make contact. Subsequently, the cooling tube elements 11a, 11b can be tightened pressure-tight with one or more fastening means, for example hose clips. In this way several types of connections can be formed. Hence, it will be apparent that the slit shown between the cooling tube elements 11a, 11b is not present at such a coupling, as it is undesirable that cooling medium leaks into the surroundings.

With a first type of coupling 31, one of the one or more hose clips is electrically connected to an electrical network, to provide the first electrical connection 22 with the electrical network, as described with reference to FIG. 4. To effect the second electrical connection 23 with the electrical network for the LED-circuits 10a, 10b, as described with reference to FIG. 4, a metal strip 15 may be affixed with a fastening means, for example a screw 20. In a similar manner, further cooling tube elements, 11a, 11b may be coupled together. The coupling takes place with an appropriate coupling with seals of metal, for example copper, and rubber. By appropriately isolating the entire coupling connection, for example with a suitable insulator material 21, for example polyurethane, the formation of ice and/or frost may be prevented. In contrast to what is shown in FIG. 5, it will be apparent that the metal strip 15 may also be interconnected, just like the cooling tube elements 11a, 11b. However, such a connection is not shown to avoid confusion with respect to the other elements.

With a second type of connection 32 (not shown separately) two cooling tube elements 11a, 11b are connected with each other in an identical manner as shown in FIG. 5. However, with this type there is no direct connection with the electrical network. On the other hand, the metal strip 15 is connected with the LED-circuit 10a and the metal strip 15 is electrically connected with the LED-circuit. The cooling tube elements 11a, 11b are also electrically connected in parallel, as they are both electrically conductive.

Figure 6:
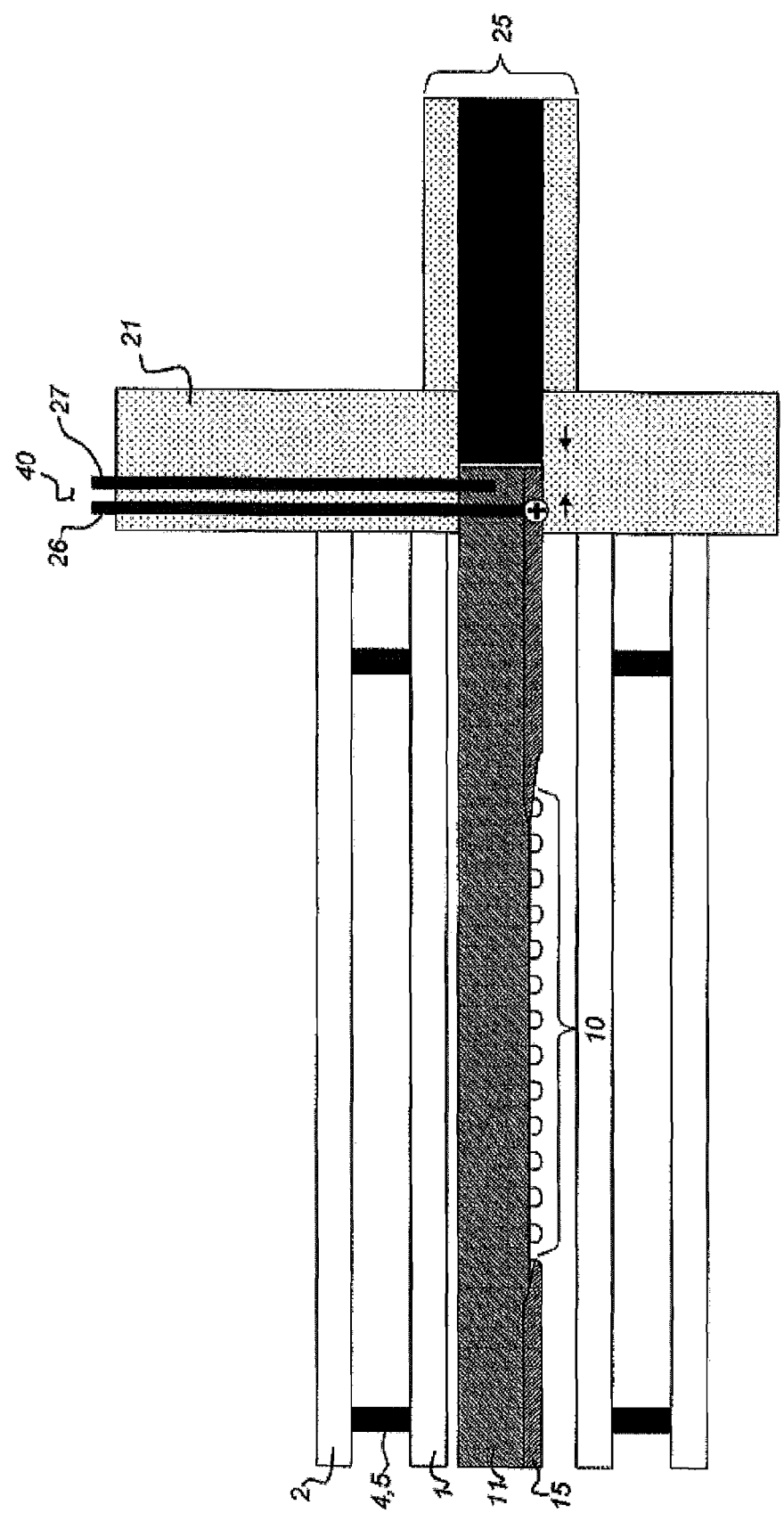
FIG. 6 shows a type of coupling of cooling tube element and a connection hose in an embodiment of the lighting device as shown in FIG. 3.

For a third type of coupling 33, namely end coupling of a series of cooling tube elements coupled to each other, end elements can be used, as shown in FIG. 6, which are at one end suitable for fitting to the tubes 1, 2 and which are at the other end suitable for coupling to one or more isolated connection hoses 25, suitable for connection to a cooling system and further electrical cables 26, 27, suitable for connection to the electrical network 40. Therefore, such an end part is an end part when it concerns the electrical supply, but is not an end part when it concerns cooling, since the cooling medium needs to be circulated, which is known to the person skilled in the art, and which will be shown in FIG. 7.

Preferably, the further electrical cables 26, 27 are thermally well isolated, such that contact of cold cooling tube elements 11a, 11b to the further electrical cables should cause as little loss as possible.

Figure 7:
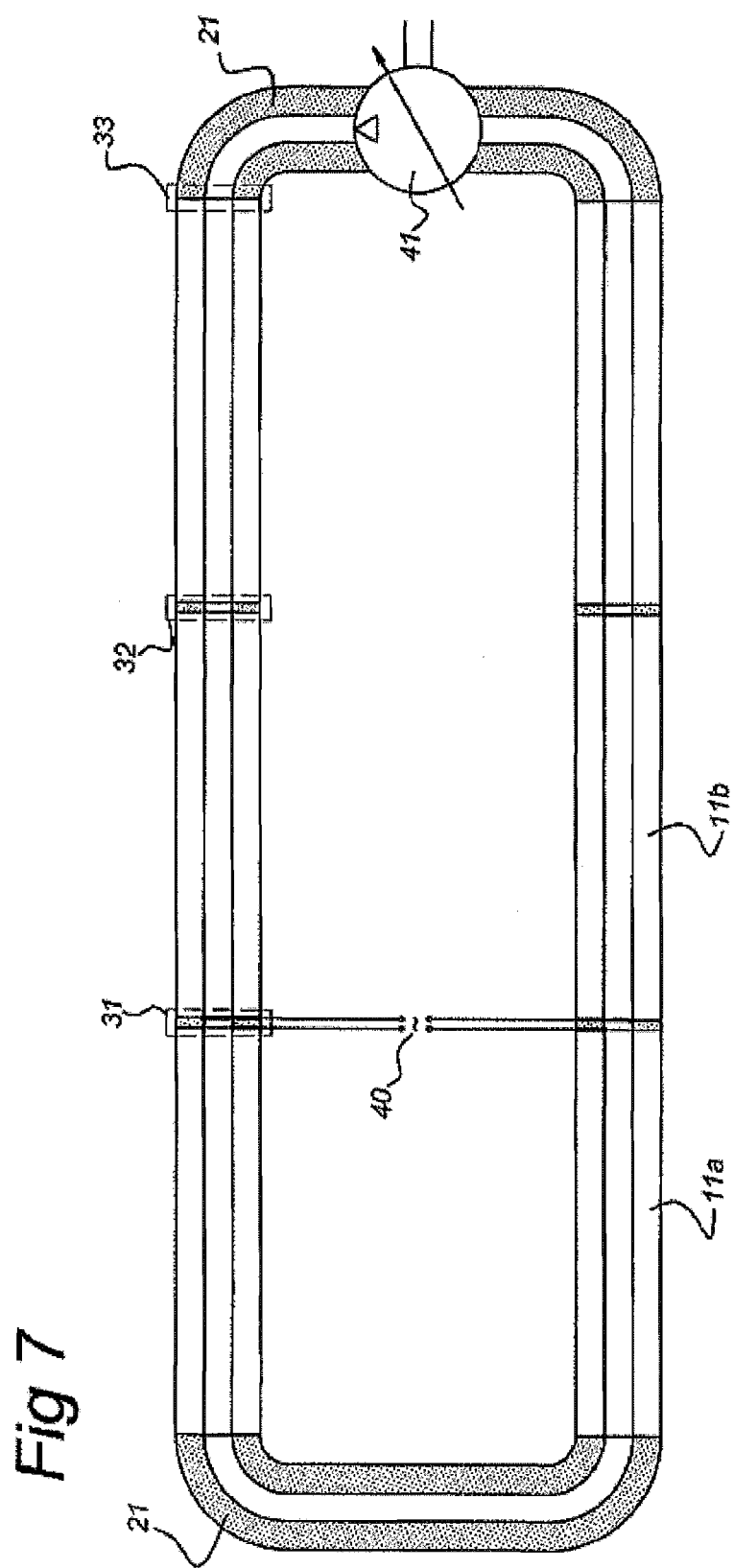
FIG. 7 shows a lighting system which comprises an embodiment of the lighting device.

FIG. 7 shows a lighting system for stimulating plant growth in a greenhouse, comprising the embodiment of the lighting device as described above. Hence, the lighting system comprises a series of coupled cooling tube elements 11a, 11b. As can be seen, all types of couplings 31, 32, 33 are present, as described above. The lighting system further comprises a cooling system 41, adapted for cooling the cooling medium. The cooling system 41 is provided with at least one input and at least one output. The cooling tube elements, such as cooling tube elements 11a, 11b, are connected in series with each other, such that they form a circulation channel in contact with the at least one input and the at least one output of the cooling system. Note that the LED circuits 10a, 10b are also electrically connected in parallel with respect to each other.

The LED circuit 10 may be implemented in several ways. In the following description some considerations are given, which may play a role in the choice of a certain embodiment of a LED circuit 10. To remain within electrical safety margins, the use of a low voltage, for example a voltage of 24 V or lower, is preferred. A photosynthesis process for plant growth at deep red light is based on the absorption of light with a peak wavelength of 662 nm by chlorophyll A and light with a peak wavelength of 642 nm by chlorophyll B. Therefore, the use of LEDs is preferred that produce such a wavelength. To generate sufficient light, a LED with a high luminescence is especially suited. An example of such a LED is a so-called power LED.

The average voltage of a red power LED is 2.2 Volt. Therefore, when using a (direct or alternating) voltage of 22 Volt, 10 red power LEDs can be connected in series. Within a lighting device as described above, the LEDs can preferably be connected in serial bridges for connection to an alternating voltage to prevent too large a load in the back direction.

By coupling cooling tube elements as described above, automatically a series circuit is formed and automatically the distinct cooling elements are electrically connected in parallel.

Figure 8:
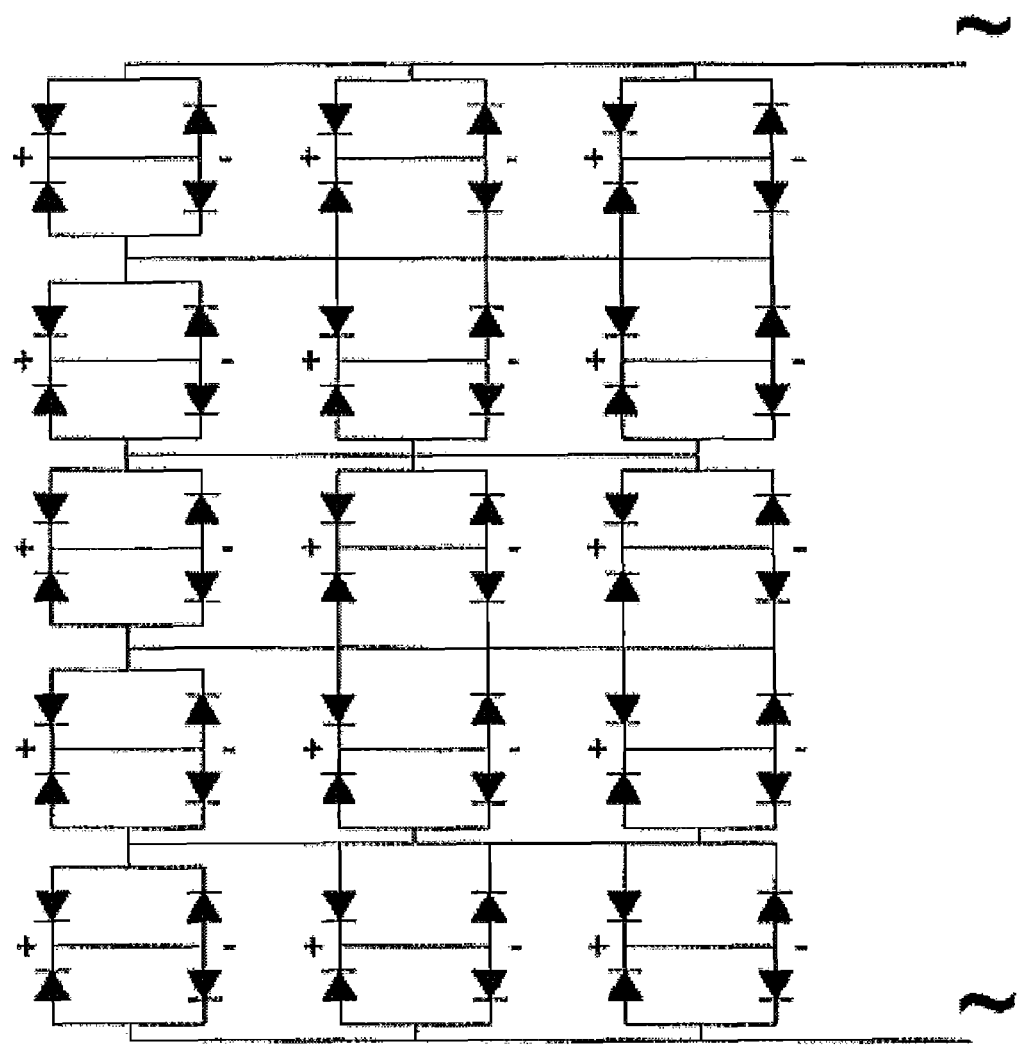
FIG. 8 shows a schematic representation of a possible LED-circuit for use in the present invention.

FIG. 8 shows a schematic view of a possible LED circuit 10. In this LED circuit 10, 60 LEDs are connected in bridges. Using a power LED of 0.77 W, wherein the typical current through a power LED amounts 350 mA, results within one cooling element in a generated power of 46.2 W at a voltage of 22 volts and a current of 2.1 Amperes. Depending on the length of the cooling tube element 11a, 11b, it is possible to realize circuits of 231 W or more in a single cooling tube element 11a, 11b.

Connected LED bridges as described in Dutch patent application 1027960 result in a circuit wherein the reliability and life span of the circuit increases. Moreover, for many chemical processes, the life span increases with approximately a factor of three for each temperature decrease of 10° C. Use is made of the fact that chemical reactions, which comprise aging processes, run at a speed which is proportional to $\exp[-\Delta H/k \cdot T]$, wherein T is the temperature in Kelvin, k is the Boltzmann constant (the gas constant R divided by Avogadro's number) en $\Delta H$ is the activation energy.

A suitable composition of LEDs for promoting plant growth, as can be read in U.S. Pat. No. 6,921,182, is a combination of red LEDs, emitting light between 600 and 700 nm, and blue LEDs, which emit light with a wavelength of approximately 470 nm. Herein, the proportion of red light is larger than the proportion of blue light. As an alternative for blue LEDs, possibly also gas discharge lamps could be used. Blue LEDs are less efficient than red LEDs but also considerably less temperature sensitive. The amount of heat energy that is added to the above described cooling device disturbs the efficiency of this device. Preferably, blue LEDs are applied in a separate electrical circuit outside of the cooling system with red LEDs.

At wavelengths of 600 to 700 nm, the visual part of the emitted energy is considerably less than, for example, the light emitted by sodium growing lamps at predominantly 580 nm. The light yield in perceivable lumen at several wavelengths according to "C.I.E. Photopic Luminous Efficiency Function 1988" are listed in Table 1.

TABLE 1

| Light yield in lumen at several wavelengths (Source: C.I.E. Photopic Luminous Efficiency Function 1988) ||
|---|---|
| Wavelength (nm) | C.I.E. factor (lumen) |
| 600 | 0.631 |
| 630 | 0.265 |
| 660 | 0.061 |
| 690 | 0.010 |

From Table 1, it can be discerned that at 630 nm, the perceivable light yield amounts to only 26.5% of the perceivable light yield at daylight. At 660 nm, this is even 6.1% and at 690 nm, only 1% of the perceivable light yield at daylight is obtained.

Lamps for assimilation lighting in greenhouses are intended for additional lighting during short days in addition to normal daylight. In a number of cases, blue light could be omitted because the amount required for the growth has already been absorbed from the daylight. Furthermore, red LEDs are very suitable for obtaining flowering of plants.

An important aspect, particularly in densely populated areas as in the Netherlands is that growing light can cause considerable light pollution. Therefore, a legal restriction applies to the quantity of light that is allowed to be perceivable outside of greenhouses.

As can be seen from Table 1, red LEDs with a wavelength of 690 nm will only irradiate 1% of visible light using the same amount of emitted electromagnetic power as LEDs with a shorter wavelength.

As mentioned before for photosynthesis, a spectral distribution in the range of 600 to 700 nm is necessary for an optimum chlorophyll A and B absorption.

Furthermore, the best distribution of LEDs with several wavelengths depends on the type of crop. For example, research of the NASA (United States) provided the following results, incorporated in Table 2.

TABLE 2

Net photosynthesis rate and biomass yields for spinach plants in a 28 days period (Source: NASA)

| Type of lamp | Photosynthesis in $\mu mol\ CO_2/(m^2 s)$ | Biomass produced per area in kg FM/$m^2$ | Biomass produced per unit of time in g FM/mol PAR[a] |
|---|---|---|---|
| CWF | 6.8 | 6.0 | 24 |
| HPS | 6.7 | 8.8 | 35 |
| 660 | 6.5 | 7.8 | 31 |
| 670 | 8.3 | 8.2 | 33 |
| 680 | 10.1 | 7.8 | 31 |
| 690 | 9.1 | 9.0 | 36 |

[a]Calculated over 28 days with 16 hours of light/8 hours dark photo period with 250 $\mu mol\ CO_2/(m^2 s)$ It appears that most of the $CO_2$ is converted and the highest amount of biomass is produced at a wavelength between 640 and 690 nm. Beyond 690 nm, both the conversion of $CO_2$ (photosynthesis) as well as the biomass produced rapidly decreases. At 705 nm, both processes are almost negligible. It has been shown that at a composition of a suitable combination of LEDs with several wavelengths, a favourable combination of LEDs, a so-called LED-module, can be obtained, wherein the proportion of LEDs with a wavelength around 662 nm, i.e. the maximum absorption wavelength for chlorophyll, accounts for approximately 75% of the total number of LEDs covering the red spectrum of 640 to 700 nm.

When selecting an optimum combination of LEDs, i.e. when composing a LED-module, on should take into account the fact that a dominant wavelength of LEDs shifts as a result of lowering the temperature. For red LEDs, the shift of the wavelength, $\Delta\lambda$, with respect to a shift in junction temperature of a LED, $\Delta T_j$, is on the order of 0.05 $\Delta\lambda/\Delta T_j$ in nm/° C. Therefore, a lowering of the junction temperature by 50° C., $\Delta T_j$=50, results in a wavelength shift $\Delta\lambda$ of the emission of 2.5 nm in the direction of a shorter wavelength.

It has been shown that LED-modules composed according to the criteria above, emit an electromagnetic (light) energy that is doubled when cooled to a temperature of about −30° C. At such a temperature and with a proper selection of red LEDs, about 50% of this electromagnetic (light) energy will be converted into light and 50% will be converted into heat.

When applied as assimilation lighting in a greenhouse, depending on the size of the greenhouse, thousands of LEDs may be involved. If every LED is operated at a voltage of 2.2 V and an electrical current of 350 mA, the generated electrical power will amount to 0.77 W per LED. Hence, at a conversion percentage as described above, namely 50% light, 50% heat development, at a temperature of −30° C., half of these 0.77 W needs to be dissipated using a heat pump as generated heat. Cooling to −30° C. at an ambient temperature of 30° C. results in a temperature difference $\Delta T$ of 60° C. To remove the heat, according to the second law of thermodynamics, approximately 22% the heat energy would be necessary. Hence, when using 1000 LEDs, this theoretically corresponds to 22% of 385 Watt=85 Watt. A cooling device to remove such a power can be designed by the average person skilled in the art using techniques known in cryogenic technology. Therefore, it will not be further discussed.

LEDs offer the possibility to bring light exactly there where it is needed, which is much more difficult with the commonly used assimilation lighting of the prior art, such as high pressure sodium lamps.

Such lamps have an energy consumption of 400 to 600 W. Because of the heat produced by these lamps, they must remain at a considerable distance, for example minimum 180 cm, above the crops to prevent burning of the crops.

Moreover, the intensity of electromagnetic radiation illuminating crops increases with the square of the distance between a light source and the crops. Therefore, when using a high pressure sodium lamp, the fact that these are placed at a larger distance of the crops will lead to a less effective illumination of these crops. For much of the energy generated for growth will illuminate locations adjacent to the crops.

In contrast to high pressure sodium lamps, LEDs may be positioned right above the crops and subsequently moved with the growth of the crops using known displacement techniques known to the average person skilled in the art. Hence, a more effective illumination of the crops can be obtained.

Moreover, it is possible to guide the light from the LEDs using optical elements, such as lenses and mirrors, to specific locations. Therefore, it becomes possible to guide light into areas that are difficult to reach.

The above description describes only a number of possible embodiments of the present invention. It is easy to realize that a lot of alternative embodiments of the invention can be considered, which will be comprised within the scope of the invention. These are defined by the following claims.

What is claimed is:

1. Lighting device for stimulating plant growth comprising:
    at least one solid state light source, suitable for emitting light of at least one wavelength within a predetermined wavelength range, wherein the at least one solid state light source is adapted for connection to an electrical network;
    a first tube, at least part of it being transparent for light within the predetermined wavelength range, wherein the at least one solid state light source is positioned in the first tube;
    a metal cooling tube with a smaller diameter than the first tube and positioned such that it is enclosed by the first tube, wherein the metal cooling tube is suitable for receiving a cooling medium and is provided with a supply opening and a discharge opening for respectively supplying and discharging the cooling medium;
    wherein the at least one solid state light source is positioned in contact with the cooling tube between the first tube and the metal cooling tube, such that the at least one solid state light source is in contact with the cooling medium.

2. Lighting device according to claim 1, wherein the cooling medium has a temperature in a temperature range between −50 and 0° C.

3. Lighting device according to claim 1, further provided with a second tube with a larger diameter than the first tube and positioned such that it encloses the first tube, wherein the second tube is at least partly transparent for light from the predetermined wavelength range.

4. Lighting device according to claim 1, wherein the metal of the metal cooling tube comprises copper and/or aluminium.

5. Lighting device according to claim 1, wherein the metal cooling tube forms a first connection of the at least one light source with the electrical network.

6. Lighting device according to claim 5, wherein the lighting device is further provided with a metal strip, which is electrically isolated from the metal cooling tube and which forms a second connection of the at least one light source with the electrical network.

7. Lighting device according to claim 3, wherein the lighting device further includes a spacing means for maintaining the first tube at a certain predetermined distance with respect to the second tube.

8. Lighting device according to claim 1, wherein the lighting device further includes a spacing means for maintaining the first tube at a certain predetermined distance with respect to the metal cooling tube.

9. Lighting device according to claim 1, wherein the at least one solid state light source is a LED.

10. Lighting device according to claim 9, wherein the at least one LED is adapted for emitting light with an opening angle between 30° and 90°.

11. Lighting device according to claim 9, wherein the at least one LED is in contact with the cooling medium through a substrate, wherein the substrate comprises a ceramic.

12. Lighting device according to claim 1, wherein the cooling medium has a temperature in a temperature range between −40 and −20° C.

13. Lighting device according to claim 1, wherein the predetermined wavelength ranges between 640-700 nm.

14. Lighting device according to claim 1, wherein the cooling medium comprises at least one of carbon dioxide, glycol and alcohol.

15. Lighting system for stimulating plant growth in a greenhouse, including:

a plurality of lighting devices according to claim 1;

a cooling system adapted for cooling a cooling medium provided with an input and an output;

wherein tubes in the plurality of lighting devices, which are adapted for receiving and transporting the cooling medium, are connected in series with each other, such that they form a circulation channel in contact with the input and output of the cooling system, and wherein the at least one solid state light source per lighting device of the plurality of lighting devices is electrically connected in parallel with respect to each other.

16. Method for manufacturing a lighting device, wherein the method comprises:

providing a first tube;

providing a metal cooling tube with a smaller diameter than the first tube, wherein the metal cooling tube is suitable for receiving a cooling medium and is provided with a supply opening and a discharge opening for respectively supplying and discharging a cooling medium;

positioning the first tube with respect to the metal cooling tube such that the metal cooling tube is enclosed by the first tube;

introducing a spacing means between both tubes to fix their mutual position;

positioning the at least one solid state light source such that it is located between the tubes, in contact with the metal cooling tube, and in contact with the cooling medium when the lighting device is in use.

17. Method for using a lighting device according to claim 1, wherein the method comprises cooling the at least one light source to a temperature in a temperature range between −50° C. and −20° C.

18. Lighting device according to claim 3, wherein cavities between the first tube and the second tube are filled with an inert gas.

* * * * *